Patented May 25, 1943

2,320,118

UNITED STATES PATENT OFFICE 2,320,118

HYDROCARBON CONVERSION AND
CATALYST THEREFOR

David G. Blaker, Webb City, Okla., assignor to
Phillips Petroleum Company, a corporation of
Delaware No Drawing. Application April 22, 1940,
Serial No. 331,046

13 Claims. (Cl. 196—52)

This invention relates to an improvement of catalysts and more particularly to an improvement of granular alumina-type catalysts that are useful for the treatment of hydrocarbons at elevated temperatures.

Alumina-type catalysts are comprised substantially of aluminum oxide. They may consist of or be derived from any of the several distinguishable materials that contain alumina as the chief component, as for example commercial aluminas such as those used for drying purposes, synthetic aluminas prepared by precipitation and/or ignition methods, and aluminas prepared from naturally occurring aluminum minerals such as bauxite, gibbsite, and diaspore. All these materials either possess a porous structure advantageous for catalytic purposes or acquire such a porous structure upon being dehydrated by heating to elevated temperatures. Of these materials, bauxite is the most abundant and the most economical source of substantially pure alumina; therefore, from it is prepared the form of alumina preferred for many catalytic purposes. Nevertheless, in so far as this invention is concerned, other forms of alumina generally may be used instead of bauxite, but usually at higher cost, as for example aluminas prepared by proper ignition or calcination of suitable aluminum compounds such as the hydroxide and the salts of volatile oxygen-containing acids such as the carbonate, sulfate, nitrate, and the like.

Catalysts of the alumina type are useful for promoting a number of chemical reactions involved in the treatment of hydrocarbons at elevated temperatures. Among these reactions are desulfurization of sulfur-containing hydrocarbon fractions, reforming and/or cyclicization of hydrocarbons, cracking of petroleum to gasoline, and dehydrogenation of hydrocarbons. Processes utilizing these reactions are of great commercial importance at the present time because they are very useful in the manufacture or in the improvement of motor fuel. Desulfurization with the aid of alumina-type catalysts effects substantial transformation of organically combined sulfur to hydrogen sulfide, which is readily removable by well known means such as a caustic alkali wash. Reforming of motor-fuel hydrocarbons consists substantially in the dehydrogenation and/or the isomerization of hydrocarbons of low anti-knock value to hydrocarbons of higher anti-knock value. Dehydrogenation of motor-fuel hydrocarbons by itself produces similarly an increase in the anti-knock value or octane rating of the motor fuel; but dehydrogenation today is of major interest because it converts gaseous paraffin hydrocarbons to gaseous olefin hydrocarbons that can be polymerized into non-gaseous hydrocarbons that have important advantages as motor fuels, lubricating oils, and special hydrocarbons of high molecular weight or that can be utilized for the manufacture of many other valuable chemical products, such as alcohols, halogenated hydrocarbons, resins, and the like.

When an alumina-type catalyst is used for the treatment of hydrocarbons, it is maintained at an elevated temperature, generally within the range of from 400 to 700° C. when the hydrocarbon itself undergoes reaction and from about 300 to 400° C. when the hydrocarbon undergoes relatively little reaction, as in desulfurization. Apparently because of the elevated temperature, which appears to promote a deposition of carbonaceous matter on the catalyst, the catalyst gradually becomes deactivated during use. To overcome the effect of the deactivation, either the temperature of the catalyst or the time of contact of the hydrocarbon with the catalyst must be increased; but eventually the catalyst becomes so deactivated that it no longer can be used profitably but must be revivified by a procedure that removes the carbonaceous deposit, as by burning it off with air at an elevated temperature. After being revivified, the catalyst has a restored activity and can be used again.

A major object of my invention is to provide improved alumina-type catalysts that have a reduced tendency to become deactivated when used at elevated temperatures for the treatment of hydrocarbons. Other objects and advantages of my invention will be recognized by those skilled in the art.

I have found that the tendency of alumina-type catalysts to become deactivated during use for the treatment of hydrocarbons, especially for the conversion of hydrocarbons, is markedly decreased if the catalyst is subjected previously to the action of a dilute solution, preferably aqueous, of one or more alkalizing compounds that leave a non-volatile residue when they are heated to an elevated temperature. The largest degree of improvement appears to be obtained when the solution is so dilute that a volume considerably in excess of that of the catalyst must be used to provide sufficient alkalizing compound. In other words, the effect of a given amount of alkalizing compounds appears to be more beneficial when it is brought into contact with the alumina-type catalyst in the form of a dilute solution than when it is in the form of a concentrated solution. Apparently the rate with which the alkalizing compound is incorporated in the catalyst exerts an important influence upon the effect produced by a given amount of alkalizing compound. Only a relatively small improvement is produced by a process in which the granular catalyst is allowed to absorb all of a relatively small volume of a relatively concentrated solution of an alkalizing compound and in which the solvent then is removed from the catalyst by evaporation. Water is the preferable and more usual solvent used, but other solvents such as ordinary alcohol may at times be used instead.

A concept that affords a theoretical explanation of the effectiveness of the invention is that alumina-type catalysts possess in general two types of catalytic activity. One type promotes the desired reaction, such as desulfurization, reforming, and/or dehydrogenation of hydrocarbons; the other type promotes undesired scission of carbon-to-carbon bonds and/or polymerization of unsaturated hydrocarbons, whereupon a relatively rapid carbonization, or coating of the catalyst with a carbonaceous deposit, takes place that renders it relatively ineffective for promoting the desired reaction. The two types of catalytic activity appear to reside in different spots or points of the catalyst. Since many polymerization catalysts are acidic, the unfavorable carbonizing and/or polymerizing points may be conceived as possessing a degree of acidity higher than that of the points that are relatively more favorable for the promotion of the desired reaction. I have found that, because of some property such as this conceivable higher degree of acidity, the carbonizing points selectively adsorb from aqueous solutions dissolved compounds that contain strongly electropositive metal elements such as the alkali metals and/or the alkaline earth metals.

When a carbonizing spot of the catalyst adsorbs a molecule of a compound containing a strongly electropositive element its catalytic properties may be suppressed more or less completely and it may become relatively or completely inactive for the promotion of the undesired scission of carbon-to-carbon bonds and/or polymerization of unsaturated hydrocarbons. In consequence thereof, the carbonizing or coating of the catalyst takes place relatively much more slowly, and the catalyst effects the desired degree of conversion or treatment of hydrocarbons for a greatly lengthened period.

However, the adsorption of the alkalizing compound should not proceed too far, lest the catalytic points promoting the desired reaction also become inactive. That is, the herein described alkalizing of the catalyst preferably should be stopped at the point at which the carbonizing spots have become substantially inactive but at which the spots promoting the desired reaction have not become inactive to a substantial degree. Treatment of the catalyst with the alkalizing compound beyond this point causes a disadvantageous and undesired decline in the catalytic activity for the promotion of the desired reaction. In other words, the amount of alkalizing compound adsorbed by the alumina-type catalyst preferably should be limited in accordance with the requirements of the particular catalyst being improved, and the most desirable extent of treatment in accordance with my invention can be readily determined by trial by one skilled in the art.

Although each particular catalyst may be such that the optimum amount of adsorbed alkalizing compound is different from the optimum amount for another particular catalyst, I have found that practically all alumina-type catalysts are greatly improved if the amount of adsorbed alkalizing compound falls within the limits of from about 0.5 to about 6 per cent by weight of the untreated catalyst, the exact amount for optimum results being largely dependent upon the particular alkalizing compound adsorbed. Since the amount of material adsorbed by a catalyst is somewhat difficult to determine directly, I have found that a convenient and advantageous way of expressing the limits of the treatment is one in terms of the concentration of the alkalizing solution and, to a relatively minor degree, of the time required by a given amount of an alumina-type catalyst to adsorb the proper amount of alkalizing compound.

This method of expressing the desired limits of treatment is further advantageous because I have found that the greatest improvement appears to be obtained under such conditions that some of the available dissolved alkalizing compound or compounds is not adsorbed but remains in solution. The reason for this peculiar and unexpected result is not definitely known, but it appears to be due to the fact that the alkalizing compound is truly selectively adsorbed and not merely deposited upon the catalytic surface.

The alkalizing solution must comprise one or more of the compounds of the alkali and alkaline earth metals that leave a non-volatile residue upon being heated to an elevated temperature. Any compound of these metals that is at least somewhat soluble and that either is non-volatile or decomposes at elevated temperatures to yield a non-volatile residue is suitable. Because of their availability and relatively low cost, the soluble hydroxides, carbonates, and chlorides are preferred; for the same reason, compounds of lithium, sodium, potassium, and calcium are preferred. Of these compounds, potassium hydroxide appears to give results that are especially consistently good.

The alkalizing compound is used in the form of a dilute solution in order that the catalyst being treated may acquire the alkalizing material by preferential adsorption. Although no lower limit for the concentration can be stated, the upper limit should not exceed about 6 per cent by weight; concentrations between 0.005 and 0.5 per cent generally are preferred.

The amount of alkalizing solution to be used in treating a particular catalyst depends upon the concentration, upon the particular alkalizing compound or compounds present in the solution, and upon the volume of the catalyst. In general, the volume required varies more or less inversely with the concentration; for the relatively concentrated solutions, which may contain about 6 per cent of alkalizing compound, a volume equal to the volume of the catalyst (measured grossly, or without deduction for voids) is sufficient; but for relatively very dilute solutions, a volume many times the volume of the catalyst must be used. When very dilute solutions, such as ordinary tap water that contains a small concentration of dissolved minerals, are used, the treatment is effected most advantageously in a catalyst-retaining vessel through which the solution is caused to flow; but when stronger solutions are used, the treatment may be effected most readily by a simple soaking of the catalyst granules in the solution.

The temperature of the alkalizing solution is not critical and may vary between the freezing point and the boiling point; a temperature in the neighborhood of room temperature is generally most convenient and therefore is preferred.

At the end of the alkalizing treatment, the catalyst may be rinsed with water relatively free from metallic salts; however, rinsing usually is unnecessary and produces no material benefit unless the alkalizing solution has been overstrong or unless the treatment has been continued too long.

In the co-pending application of Blaker and Matuszak, Serial No. 328,594, filed April 8, 1940, is described the improving of aluminiferous material intended for use as alumina-type catalysts by a washing treatment that effects the removal of minute particles or dust. Optimum results are obtained if the washing treatment is applied to the aluminiferous material after it has been subjected to dehydration or calcination. The present invention goes beyond the concept of the washing treatment in that a material is added to the catalyst in such manner that carbonizing tendencies are preferentially decreased, and it becomes capable of effecting conversion or treatment of hydrocarbons for a greatly lengthened period. As will be more specifically shown, the treatment of my present invention produces an improvement which is in addition to the improvement effected by the process of the aforementioned application.

Although some benefit is obtained from applying my alkalizing treatment to granular aluminiferous materials prior to dehydration or calcination, best results are obtained if the treatment is made after the calcination. Otherwise, a considerable part of the alkalizing compound is taken up by catalytically inert material or is removed by the washing treatment of the aforementioned co-pending application.

Dehydrated bauxite may be taken as a preferred alumina-type catalyst; but my invention is not to be limited thereby except as specified in the appended claims. In the preparation of the catalyst, the bauxite first is crushed or broken into granules. The granules may be of any suitable size, but a size between about 4 and 20 mesh is preferred. The granular bauxite is then dehydrated by being heated to an elevated temperature. The temperature of dehydration is not critical and may reach as high as 800° C. without producing any apparent deleterious effects; a temperature range for dehydration of from about 300° C. to about 600° C. is preferred. The time of dehydration also is not critical; most of the water is removed by the time the temperature of the bauxite reaches 500° C., and exposure to temperature of 600° C. over a wide range of heating periods, such as the range 1 to 24 hours, produces no detectable change in catalytic properties. Similarly, the atmosphere in which the granular bauxite is dehydrated is not critical; dehydrations in air, in hydrogen, and in nitrogen produce alumina-type catalysts of apparently identical catalytic efficiency.

Dehydrogenation of paraffin hydrocarbons may be taken for illustrative purposes as an example of the treatment or conversion of hydrocarbons; but my invention is not to be restricted thereto except as specified in the appended claims. The highly selective catalytic dehydrogenation action of the alumina formed by dehydration of the particular bauxite that is found in nature in the form of fairly hard pebbles embedded in a bed of much softer material, which apparently is a siliceous clay and which can be removed to a large extent by a superficial washing with water, and that consequently sometimes is known as "washer product" bauxite, is indicated by the data of the following tabulation, which gives typical analyses of the effluents obtained when paraffin gases were passed separately at atmospheric pressure over the alumina formed from the bauxite by dehydration in air at temperatures up to about 600° C. The gases were passed at the rate of 1000 volumes, measured at 0° C. and 1 atmosphere, per volume of catalyst per hour; and the temperature of dehydrogenation was within the range of 570 to 625° C., which is a range that I prefer, although temperatures outside this range may also be used. These conditions correspond to a contact time of about 0.5 second.

*Typical analyses of products of dehydrogenation (per cent by volume)*

| Original gas | Isobutane | | Normal butane | | Propane | |
|---|---|---|---|---|---|---|
| Hydrogen | 20.0 | 31.3 | 12.2 | 19.3 | 14.3 | 26.6 |
| Methane | 2.8 | 4.1 | 1.2 | 2.3 | 1.5 | 3.7 |
| Ethylene | 0.2 | 0.4 | 0.7 | 1.3 | 0.6 | 1.3 |
| Ethane | 0.0 | 0.1 | 0.4 | 0.7 | 0.0 | 0.0 |
| Propylene | 1.5 | 2.2 | 0.4 | 1.4 | 11.3 | 18.0 |
| Propane | 0.0 | 0.1 | 0.0 | 0.2 | 72.3 | 50.4 |
| Butylenes | 15.8 | 21.4 | 9.1 | 12.9 | | |
| Butane | 59.1 | 40.0 | 75.5 | 61.3 | | |
| Heavier | 0.5 | 0.4 | 0.5 | 0.6 | | |
| | 100.0 | 100.0 | 100.0 | 100.0 | 100.0 | 100.0 |

These data indicate that the particular alumina derived by dehydration of this bauxite has an exceptionally high catalytic dehydrogenation activity for alumina-type catalysts under the stated operating conditions and produces a relatively clean-cut and consequently advantageous dehydrogenation of paraffin hydrocarbons into the corresponding olefin hydrocarbons.

In one specific embodiment of my invention, the alumina-type catalyst, after being freed from minute dust particles in accordance with the process of the aforementioned copending application by the use of water, such as distilled water or, alternately, tap water containing dissolved inorganic chemicals such as those present in natural waters or in waters that have been chemically treated to decrease the degree of natural hardness, is kept in contact with continuously fresh tap water for a period greatly in excess of that of about 10 to 20 minutes required for the removal of the dust particles. The optimum period varies somewhat with the exact content of inorganic matter in the tap water and with the rate at which the water is flowing; but I have found that when the water is made to flow upwardly through an approximately 3-inch layer of alumina granules at such a rate that particles smaller than about 40 mesh become entrained and are swept away by the water, satisfactory and highly beneficial results generally are obtained by continuing the washing for a period of from 1 to 3 days. In certain localities in which the water is very highly charged with inorganic matter, the period of washing may be made shorter; in localities in which the water is relatively lightly charged with inorganic matter, it may be made longer; in any particular case, a suitable period may be found readily by trial.

Under the conditions stated, unsoftened tap water having approximately the following analysis has given highly satisfactory results.

| | Ppm. |
|---|---|
| Sodium and potassium | 121 |
| Calcium | 100 |
| Magnesium | 23 |
| Iron and aluminum | 3 |
| Silica | 4 |
| Chloride | 291 |
| Bicarbonate | 214 |
| Sulfate | 27 |
| Total solids | 783 |

Water from the same source, after having been passed through a softener of the zeolite type, whereby the content of sodium was considerably increased and the content of calcium and magnesium was correspondingly decreased, gave equally satisfactory results.

After the catalyst has adsorbed from about 0.5 to about 6 per cent of its own weight of the alkalizing compound or compounds, the treatment with the tap water is stopped, and the catalyst is dried; the catalyst then is ready to be used for the conversion or treatment of hydrocarbons.

This specific embodiment of my invention is diametrically opposed to the process of leaching that is sometimes mentioned in connection with the improvement of solid catalysts. Leaching is a process by which certain compounds, frequently compounds containing alkali or alkaline earth elements, are dissolved by water percolating through a bed of catalyst granules and are removed thereby from the catalyst; in such a leaching process distilled water is more effective than tap water, and distilled water containing an acid frequently is even more effective. In contradistinction to such leaching, my process effects an addition of alkalizing compounds containing alkali and/or alkaline earth elements to the catalyst, and the addition is effected not merely by deposition but by selective adsorption. Neither distilled water nor acids can effect any such addition; they therefore are useless in my present process, although they may be highly useful in other processes.

*Example I*

A sample of the particular hard bauxite sometimes known as "washer product" bauxite, which is mined as fairly hard pebbles by a process that removes a large part of the much softer surrounding matrix by a washing with water, was crushed and sieved to 20–40 mesh size. It was dehydrated by being heated gradually to 600° C. in air and kept at this temperature for an hour. The dehydrated granules were placed in a vertical washing tower, forming a layer about 3 inches deep, and tap water of the composition just given was injected at the lower end of the tower at such a rate that the granules were kept in considerable agitation; at this rate visible dust particles were removed in about 15 minutes. The washing was continued for 20 hours; the granules then were removed and dried in air at 600° C. for an hour. After being cooled, a measured portion of the granules was heated to about 590° C. in hydrogen and used for the dehydrogenation of isobutane at atmospheric pressure, at a space velocity of 1000 volumes (NTP) of isobutane per volume of catalyst per hour, and under temperature conditions so controlled automatically that the conversion to isobutylene was maintained substantially constant at 17 per cent. The length of the run to the point at which the temperature of the catalyst reached 625° C. was 100 hours. The minimum temperature during the run was 590° C.

A portion of the same batch of bauxite, after being treated in substantially the same manner except that distilled water was used instead of tap water, gave a run of 55 hours for the dehydrogenation of isobutane under the same conditions, and the minimum temperature during the run was 580° C.

A portion of the same batch of bauxite, after being treated in substantially the same manner except that the post-dehydration treatment with water and the subsequent drying were omitted, gave a run of only 22 hours for the dehydrogenation of isobutane under the same conditions, and the minimum temperature during the run was the same as that in the run made with the catalyst treated with tap water, namely, 590° C.

The foregoing data show that, under identical conditions of use for the conversion of 17 per cent of isobutane to isobutylene per pass, granular bauxite that was dehydrated and then was washed under such conditions that the wash water, which was distilled water, effected substantially only a removal of adherent dust particles gave a run that was longer by 150 per cent than that given by identical granular bauxite that had been dehydrated only. The washing with distilled water increased the initial activity of the catalyst, as is indicated by the minimum temperature being lowered by 10° C. In contradistinction to this improvement, which is typical for dehydrated bauxite improved in accordance with the process of the aforementioned co-pending application, identical granular bauxite that was dehydrated and then was washed under such conditions that the wash water, which was tap water, effected an addition to the catalyst by selective adsorption of dissolved alkalizing compounds, gave a run that was longer by 82 per cent than that given by the bauxite that was dehydrated and then was washed with distilled water and by 350 per cent than that given by the bauxite that was dehydrated only. The adsorption of alkalizing compounds from the tap water by the catalyst so modified the catalytic surface that the gain in initial activity attributable to the removal of dust particles was exactly counterbalanced, as is indicated by the minimum temperature being restored to that characteristic of the bauxite that was merely dehydrated without a subsequent washing treatment; but the modification was such that the catalyst effected the desired rate of conversion for a greatly lengthened period.

*Example II*

A relatively hard bauxite of 20 to 40 mesh in granular size was dehydrated by being heated gradually to 600° C. in air and kept at this temperature for an hour. Portions of the dehydrated bauxite were washed free of dust particles and then were treated in accordance with my invention. Details of the treatment and of the results obtained with these portions when they were used for the dehydrogenation of isobutane, at atmospheric pressure, at a space velocity of 1000 volumes of isobutane (NTP) per volume of catalyst per hour, and under temperature conditions so controlled automatically that the conversion to isobutylene was maintained substantially constant at 20 per cent, are given in the following tabulation. For the sake of comparison, results obtained with portions of the same batch of bauxite that were given treatments not in accordance with my invention are included in the tabulation; these portions are designated by letters of the alphabet, whereas the portions treated in accordance with my invention are designated by arabic numerals. The runs were stopped when the temperature reached a value of 625° C.

| Sample or portion | Post-dehydration treatment | | Min. temp., °C. | Hr. at 20% conversion. |
|---|---|---|---|---|
| | Water | Time | | |
| 1 | Tap | 20 hr | 602 | 32 |
| 2 | do | 70 hr | 602 | 36 |
| 3 | do | 3+70 hr.[1] | 598 | 33 |
| A | Distilled | 20 hr | 588 | 22 |
| B | do | 15 min | 590 | 23 |
| C | None | | 590 | 15 |
| D | Tap | 6 days | 598 | 20 |

[1] The 20 cc. sample of dehydrated bauxite was washed for 3 hours with tap water and then soaked for 70 hours in tap water that had been concentrated from 1 liter to 250 cc.

Portion C, which was given no treatment subsequent to dehydration, effected 20 per cent conversion for 15 hours. Removal of dust particles by washing with distilled water for 15 minutes, as illustrated by portion B, caused an increase in the length of the run to 23 hours. Long-continued treatment for 20 hours with distilled water, as illustrated by portion A, produced a slight decrease in the length of the run to 22 hours, probably because of a leaching action of the water. Similar long-continued treatment with flowing tap water, on the other hand, as illustrated by sample 1, increased the length of the run to 32 hours, which is longer by 9 hours or by 39 per cent than that obtained with portion B and by 17 hours or by 113 per cent than that obtained with portion C. Continuing the treatment with tap water for a total of 70 hours, as illustrated by sample 2, produced a slight further increase in the length of the run to 36 hours. Treating the bauxite with flowing tap water for only a few hours and then further treating it by soaking it in tap water that had been concentrated by evaporation, as illustrated by sample 3, produced similarly advantageous results. Too long a treatment with flowing tap water, as illustrated by portion D, which was treated for 6 days, produced an undesirable decrease in the length of the run to 20 hours.

In a preferred specific embodiment of my process, the alumina-type catalyst, after being freed from dust particles in accordance with the aforementioned co-pending application by the use of water, is subjected to the action of a dilute solution of one or more alkalizing compounds for a period sufficient to effect a substantial decrease in the carbonizing tendency of the catalyst without more than a relatively minor decrease in the dehydrogenating, reforming, and/or desulfurizing activity of the catalyst. The amount of alkalizing compound adsorbed during such action should be from about 0.5 to about 6 per cent of the weight of the untreated catalyst. The volume of solution should be at least as large as the gross volume of the catalyst; I prefer to use a volume about from ten to thirty times as large as the gross volume of the ctatalyst. After the selective adsorption is complete, the catalyst is removed from the solution and dried; it is then ready to be used for the treatment of hydrocarbons. Alumina-type catalysts improved in accordance with this preferred embodiment generally effect a desirable degree of conversion or treatment of hydrocarbons for periods considerably longer than those characteristic of the same catalysts before such improvement.

*Example III*

Bauxite of 20 to 40 mesh was dehydrated and washed free of dust particles as described in Example I. Portions then were subjected to the action of aqueous solutions containing 0.2 per cent by weight of various alkalizing compounds. The volume of solution was approximately thirty times that of the catalyst. Other details of the alkalizing treatment and the results obtained for the dehydrogenation of isobutane under the conditions already described in Example II are given in the following tabulation.

| Sample or portion | Alkalizing treatment | | Min. temp., °C. | Hr. at 20% conversion |
|---|---|---|---|---|
| | Solution | Time | | |
| | | Hours | | |
| 4 | 0.2% NaCl | 24 | 593 | 28 |
| 5 | 0.2% NaCl | 48 | 599 | 38 |
| 6, after revivication. | | | 598 | 37 |
| 6 | 0.2% CaCl$_2$ | 48 | 593 | 38 |
| 7 | 0.2% KI | 48 | 584 | 30 |
| 8 | 0.2% Na$_2$CO$_3$ | 48 | 608 | 28 |
| 9 | 0.2% NaHCO$_3$ | 48 | 607 | 25 |
| E | None | | 590 | 22 |

Portion E, which received no alkalizing treatment but was merely free of dust particles, effected 20 per cent conversion for 22 hours, confirming the results already reported for portions A and B. Soaking the catalyst in thirty times its own volume of 0.2 per cent sodium chloride solution for 24 hours, as is illustrated by sample 4, increased the length of the run to 28 hours. Doubling the soaking period, as illustrated by sample 5, increased the length of the run to 38 hours, which is a period longer by 16 hours or by 73 per cent than that obtained with portion E. Practically the same performance was obtained after sample 5 was revivified by removal of carbonaceous deposits with air at about 600° C., illustrating that the effect of the alkalizing treatment is not lost during revivification. An improvement like that of sample 5 was obtained by soaking in 0.2 per cent calcium chloride for 48 hours, as is illustrated by sample 6. A somewhat smaller improvement, as illustrated by sample 7, resulted from soaking in 0.2 per cent potassium iodide for 48 hours, obviously because the solution contained a relatively insufficient number of molecules of alkalizing compound (because of the relatively high atomic weight of iodine). This example thus illustrates the general fact that a larger weight of compounds having relatively heavy molecules is necessary to produce a given alkalizing effect than that of compounds having light molecules.

The catalysts of samples 8 and 9, which were soaked for 48 hours in 0.2 per cent solutions of sodium carbonate and sodium bicarbonate, respectively, exhibited relatively small improvements. As is indicated by the relatively high minimum temperatures, these catalysts adsorbed more than the optimum amount of alkalizing compound for most efficient use of the catalysts for the dehydrogenation of isobutane at temperatures up to 625° C. The data illustrate the general fact that compounds that are strongly alkaline in solution are more effective for the alkalizing of alumina catalysts than compounds that are substantially neutral. Such strongly alkaline compounds may be used in relatively weak solution, advantageously from about one-tenth to about one-half the strength of neutral-salt solutions.

The last column of the following tabulation gives the lengths of runs obtained for the dehydrogenation of isobutane at a space velocity of 1000 with catalysts from the same batch of bauxite that had been overtreated for optimum results at temperatures up to only 625° C. It is helpful in indicating the range in which such overtreatment takes place. The volume of treating solution was about thirty times that of the catalyst. Overtreatment leads to results that are definitely below the optimum for the dehydrogenation of isobutane at a space velocity of 1000 volumes (N. T. P.) per volume of catalyst per hour and at temperatures up to only 625° C. However, such overtreated catalysts may be used to exceptionally good advantage at lower space velocities and in a temperature range that extends beyond 625° C., up to about 700° C. Moreover, if a catalyst has been overtreated to an objectionable extent, the overtreatment may be reduced by leaching.

| Alkalizing treatment | | Min. temp., °C. | Hr. at 20% conversion |
|---|---|---|---|
| Solution | Time | | |
| 0.2% NaOH | 72 hr | 624 | 10 |
| 0.2% Na₂Al₂O₄ | do | 619 | 20 |
| 0.2% Na₂SiO₄ | do | 610 | 19 |
| 1.7% KI | 48 hr | 616 | 10 |
| 0.7% KI | do | 609 | 20 |

At temperatures about 625° C., the overtreated samples of this tabulation were capable of effecting 20 per cent conversion of isobutane for periods considerably longer than those obtainable with untreated samples or with samples that had received a treatment best suited for my preferred range of temperatures for the dehydrogenation of isobutane.

*Example IV*

Aluminum hydroxide was precipitated from a hot solution of 221 grams of hydrated aluminum nitrate, $Al(NO_3)_3 \cdot 9H_2O$, in 12 liters of distilled water by the addition of excess ammonium hydroxide. The precipitate was washed twice with 12 liters of hot distilled water. Then it was dried at 50° C. for a week, at 150° C. for a day, and at gradually increasing temperatures up to 600° C. for another day. One and the same portion of the resultant alumina-type catalyst granules was used in a series of consecutive runs in which isobutane was dehydrogenated at atmospheric pressure, at a space velocity of 1000 volumes of gas (NTP) per volume of catalyst per hour, and under temperature conditions so controlled automatically that the conversion to isobutylene was maintained substantially constant at 17 per cent. Details of various post-dehydration treatments given this portion and the pertinent results of the runs, including the length of the runs up to a temperature of 625° C., are given in the following tabulation. After each run, the catalyst was revivified by removal of carbonaceous deposits in a stream of air at a temperature gradually increased to 600° C. before it was given further treatment.

| Post-dehydration treatment | Min. temp., °C. | Hr. at 17% conversion |
|---|---|---|
| None | 568 | 35 |
| Revivified only | 570 | 38 |
| Leached with distilled water | 567 | 34 |
| 30 vols. 0.01% KOH for 24 hr | 576 | 35 |
| 30 vols. 0.03% KOH for 48 hr | 588 | 57 |

The results show that the performance of the catalyst was affected relatively only slightly by revivification, by leaching with distilled water, and by soaking in 30 volumes of 0.01 per cent solution of potassium hydroxide for 24 hours. But a further treatment with 30 volumes of a 0.03 per cent solution of potassium hydroxide for 48 hours effected such an improvement in the catalyst that the length of the run was increased from 35 hours to 57 hours or by 63 per cent.

Previous to the final treatment with potassium hydroxide, the catalyst was capable of dehydrogenating isobutane under the conditions already stated, but to a final temperature of 650° C., for 75 hours. After the final treatment, it was capable of giving a run, up to the same final temperature, of 150 hours; the increase in the length of the run attributable to the additional adsorption of the alkalizing compound was 75 hours, or 100 per cent.

Many other specific examples could be cited in which the improvement effected by my alkalizing treatment would be illustrated for the treatment or conversion at elevated temperatures of hydrocarbons other than isobutane. However, such additional examples are not given because they would lengthen the description of my invention unduly and because the examples given hereinbefore are believed to be sufficient as clear illustrations of some of the possible modes of operation of my invention.

In the interests of simplicity and brevity, I have limited the description of my invention and the specific examples to particular materials and to particular conditions of use. This description and these examples are given solely for illustrative purposes and not as limiting my invention. Many materials and conditions other than those specifically mentioned are comprised in many modifications of my invention that will be obvious to those skilled in the art. Therefore my invention is not to be limited by the foregoing specification but is to be understood to be as extensive in scope and equivalents, within the scope of the appended claims, as the prior art allows.

I claim:

1. The process of improving the catalytic activity of granular catalysts consisting essentially of alumina, which consists in removing particles smaller than about 40 mesh from the catalyst granules by a stream of water and treating the washed granules with a stream of an aqueous solution containing as the sole active material between about 0.005 and 0.5 per cent by weight of an alkalizing compound that upon being heated to an elevated temperature yields a nonvolatile residue containing an element selected from the alkali metals and alkaline earth metals, for a period sufficient for the catalyst to adsorb selectively a total of from about 0.5 to about 6 per cent of the said alkalizing compound by weight.

2. The process of improving granular catalytic material consisting essentially of aluminum oxide effective for the treatment of hydrocarbons, which consists in subjecting the said aluminum oxide to the action of a solution containing as the sole active component alkalizing material that upon being heated to an elevated temperature yields a non-volatile residue containing an element selected from the alkali metals and the alkaline earth metals for a period sufficient for the catalyst to adsorb selectively from about 0.5 to about 6 per cent of the said alkalizing material by weight.

3. A process for the treatment of hydrocarbons which comprises contacting said hydrocarbons with a granular aluminum oxide catalyst consisting of alumina which has been subjected to the action of an aqueous solution containing as the sole active component not more than about 6 per cent by weight of alkalizing material selected from the hydroxides of the alkali metals and the alkaline earth metals, the amount of said solution and the duration of said action being sufficient for the alumina to adsorb selectively a total of from about 0.5 to about 6 per cent of said alkalizing material by weight.

4. A process for the treatment of hydrocarbons which comprises contacting said hydrocarbons with a granular aluminum oxide catalyst consisting of alumina which has been subjected to the action of an aqueous solution containing as the sole active component not more than about 6 per cent by weight of alkalizing material selected from the carbonic acid salts of the alkali metals and the alkaline earth metals, the amount of said solution and the duration of said action being sufficient for the alumina to adsorb selectively a total of from about 0.5 to about 6 per cent of said alkalizing material by weight.

5. A process according to claim 3 in which the hydroxide is potassium hydroxide.

6. A process according to claim 4 in which the carbonic acid salt is a sodium carbonate.

7. A process for the treatment of hydrocarbons which comprises contacting said hydrocarbons under reaction conditions of temperature and pressure with a granular aluminum oxide catalyst consisting of alumina which has been subjected to the action of an aqueous solution containing as the sole active component not more than about 6 per cent by weight of an alkalizing material that upon being heated to an elevated temperature yields a non-volatile residue containing an element selected from the alkali metals and the alkaline earth metals for a period sufficient for the selective adsorption by said alumina of about 0.5 to 6 per cent of said alkalizing material by weight.

8. A process for the dehydrogenation of hydrocarbons having at least two carbon atoms per molecule which comprises contacting a hydrocarbon stream at dehydrogenation temperatures and pressures with a catalyst consisting of bauxite which has been treated with an aqueous solution containing as the sole active material not more than about 6 per cent of a compound of a metal selected from the alkali metals and the alkaline earth metals which yields a non-volatile residue containing said metal on heating to an elevated temperature for a period sufficient for the bauxite to selectively adsorb from about 0.5 to about 6 per cent of said compound by weight.

9. The process of improving granular catalytic material consisting essentially of aluminum oxide effective for the treatment of hydrocarbons, which consists in subjecting the said aluminum oxide to the action of an aqueous solution containing as the sole active material about 0.005 to 0.5 per cent by weight of an alkalizing compound that upon being heated to an elevated temperature yields a non-volatile residue containing an element selected from the alkali metals and the alkaline earth metals for a period sufficient for the catalyst to adsorb selectively a total of from about 0.5 to about 6 per cent of the said alkalizing compound by weight.

10. An improved catalytic material effective for the conversion of hydrocarbons at elevated temperatures which consists essentially of alumina which has selectively adsorbed 0.5 to 6 per cent by weight of an alkalizing compound that upon being heated to an elevated temperature yields a non-volatile residue containing an element selected from the alkali metals and the alkaline earth metals, said adsorption having taken place from a dilute solution containing a compound of said element as the sole active material.

11. A process according to claim 7 in which the alkalizing material is selected from the halides of the alkali metals and alkaline earth metals.

12. The process of claim 7 in which the alkalizing material is calcium chloride.

13. An improved catalytic material according to claim 10 in which the concentration of the dilute solution of said alkalizing compound is from about 0.005 to about 0.5 per cent by weight.

DAVID G. BLAKER.

CERTIFICATE OF CORRECTION.

Patent No. 2,320,118.  May 25, 1943.

DAVID G. BLAKER.

It is hereby certified that error appears in the printed specification of the above numbered patent requiring correction as follows: Page 5, first column, line 74, for "ctatalyst" read --catalyst--; page 6, first column, line 41, for "about" read --above--; and that the said Letters Patent should be read with this correction therein that the same may conform to the record of the case in the Patent Office.

Signed and sealed this 20th day of July, A. D. 1943.

Henry Van Arsdale,
Acting Commissioner of Patents.